(12) United States Patent
Urano

(10) Patent No.: US 12,010,777 B2
(45) Date of Patent: Jun. 11, 2024

(54) CRIME PREVENTION SYSTEM, CRIME PREVENTION METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventor: Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/213,001

(22) Filed: Jun. 22, 2023

(65) Prior Publication Data

US 2023/0422377 A1 Dec. 28, 2023

(30) Foreign Application Priority Data

Jun. 28, 2022 (JP) .................. 2022-103791

(51) Int. Cl.
*H05B 47/105* (2020.01)
*B60Q 1/50* (2006.01)
*G06V 20/52* (2022.01)
*G06V 20/58* (2022.01)
*G06V 40/10* (2022.01)
*G06V 40/20* (2022.01)

(52) U.S. Cl.
CPC ........... *H05B 47/105* (2020.01); *B60Q 1/544* (2022.05); *G06V 20/53* (2022.01); *G06V 20/58* (2022.01); *G06V 40/10* (2022.01); *G06V 40/20* (2022.01)

(58) Field of Classification Search
None
See application file for complete search history.

(56) References Cited

U.S. PATENT DOCUMENTS

| 5,467,071 A | * | 11/1995 | Koenig | ................. B60Q 1/544 340/460 |
| 11,776,046 B1 | * | 10/2023 | Leal | ................... G06Q 30/0623 707/736 |
| 2010/0244698 A1 | * | 9/2010 | Nakamura | ............... B60Q 1/38 315/77 |
| 2010/0302797 A1 | * | 12/2010 | Pastrick | ............... B60R 1/1207 362/555 |

(Continued)

FOREIGN PATENT DOCUMENTS

| JP | 2009-057014 A | 3/2009 |
| JP | 2017-024647 A | 2/2017 |
| JP | 2017-068394 A | 4/2017 |

*Primary Examiner* — Wilson Lee
(74) *Attorney, Agent, or Firm* — Dinsmore & Shohl LLP

(57) ABSTRACT

The crime prevention system executes evaluating whether or not a degree of safety of the passenger getting off the vehicle is equal to or higher than a predetermined level on a basis of a recognition result of the recognition sensor (at least one of a first recognition sensor and a second recognition sensor), in a case where the degree of safety is lower than the predetermined level, executing illumination control of irradiating a position of the passenger getting off the vehicle with illumination from the illumination device (at least a first illumination device) while the vehicle is kept stopped for a period set in accordance with the degree of safety, and terminating the illumination control in response to a predetermined termination condition being satisfied.

8 Claims, 8 Drawing Sheets

1: CRIME PREVENTION SYSTEM

(56) References Cited

U.S. PATENT DOCUMENTS

| | | | |
|---|---|---|---|
| 2014/0197943 A1* | 7/2014 | Que | B60Q 1/324 340/471 |
| 2014/0236430 A1* | 8/2014 | Kim | B60R 21/34 701/49 |
| 2014/0310739 A1* | 10/2014 | Ricci | G06Q 20/321 725/75 |
| 2018/0354411 A1* | 12/2018 | Shmueli Friedland | G05D 1/0278 |
| 2019/0139411 A1* | 5/2019 | Dhull | B60Q 1/543 |
| 2019/0279447 A1* | 9/2019 | Ricci | A61B 5/4809 |
| 2019/0371171 A1* | 12/2019 | Sholingar | G08G 1/096725 |
| 2020/0314333 A1* | 10/2020 | Liang | H04N 7/181 |
| 2021/0009064 A1* | 1/2021 | Kim | B60R 21/01552 |
| 2021/0397858 A1* | 12/2021 | Buerkle | G06V 20/59 |
| 2022/0276618 A1* | 9/2022 | Aroskar | G06V 10/87 |
| 2023/0226998 A1* | 7/2023 | Ali | G06V 20/52 340/426.1 |

* cited by examiner

| DEGREE OF SAFETY OF PASSENGER GETTING OFF VEHICLE | RECOGNITION OF ENVIRONMENT SITUATION AROUND VEHICLE | RECOGNITION OF PERSONS (INCLUDING PASSENGER GETTING OFF VEHICLE) | NECESSITY TO PROVIDE CRIME PREVENTION SERVICE AND PROVISION PERIOD |
|---|---|---|---|
| LEVEL 5 | · BRIGHT (SUCH AS DAYTIME, PLACE WHERE SUFFICIENT ILLUMINANCE IS OBTAINED BY OUTDOOR LIGHT, ILLUMINATION, OR THE LIKE, EVEN DURING NIGHT) | --- | UNNECESSARY |
| LEVEL 4 | · DARK (SUCH AS DURING NIGHT AND IN TUNNEL)<br>· THERE ARE MANY PEOPLE | --- | UNNECESSARY |
| LEVEL 3 | · DARK (SUCH AS DURING NIGHT AND IN TUNNEL)<br>· THERE ARE FEW PEOPLE | · THE NUMBER OF RECOGNIZED PERSONS: ONE (THE NUMBER OF RECOGNIZED PASSENGERS P1 GETTING OFF VEHICLE: ONE) | NECESSARY (CRIME PREVENTION SERVICE PROVISION PERIOD: 15 SECONDS) |
| LEVEL 2 | | · THE NUMBER OF RECOGNIZED PERSONS: TWO OR MORE (THE NUMBER OF RECOGNIZED PASSENGERS P1 GETTING OFF VEHICLE: ONE, AND THE NUMBER OF RECOGNIZED SURROUNDING PERSONS P2: ONE OR MORE) | NECESSARY (CRIME PREVENTION SERVICE PROVISION PERIOD: 30 SECONDS) |
| LEVEL 1 | | · THE NUMBER OF RECOGNIZED PERSONS: TWO OR MORE (INCLUDING AT LEAST ONE OF THE NUMBER OF RECOGNIZED PASSENGERS P1 GETTING OFF VEHICLE: ONE OR MORE, AND THE NUMBER OF RECOGNIZED SURROUNDING PERSONS P2: ONE OR MORE)<br><br>· RECOGNITION OF BEHAVIOR OF PASSENGER P1 GETTING OFF VEHICLE (IN A CASE WHERE THE NUMBER OF PASSENGERS P1 GETTING OFF VEHICLE IS TWO OR MORE): PASSENGERS P1 GETTING OFF VEHICLE INCLUDE PERSON WHO PERFORMS SUSPICIOUS BEHAVIOR<br><br>· RECOGNITION OF BEHAVIOR OF SURROUNDING PERSON: SURROUNDING PERSONS OF PASSENGER P1 GETTING OFF VEHICLE INCLUDE PERSON WHO PERFORMS SUSPICIOUS BEHAVIOR | NECESSARY (CRIME PREVENTION SERVICE PROVISION PERIOD: ONE MINUTE) |

Fig.2

CRIME PREVENTION SYSTEM, CRIME PREVENTION METHOD, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2022-103791, filed Jun. 28, 2022, the contents of which application are incorporated herein by reference in their entirety.

BACKGROUND

Technical Field

The present disclosure relates to a crime prevention system that provides a crime prevention service to a passenger getting off a vehicle that transports passengers, a crime prevention method, and a crime prevention program.

Background Art

JP 2009-057014 A discloses a vehicle illumination device capable of improving visibility around a vehicle and a crime prevention effect when a passenger gets off the vehicle using a sensor that is provided in the vehicle and detects a position of a person located around the vehicle and an illumination light that irradiates a circumference of the vehicle. In this technique, in a case where a position of a person located around the vehicle is detected, illumination corresponding to a moving destination position of the person is emitted.

Note that examples of documents describing a level of a technique in a technical field related to the present disclosure can include JP 2017-024647 A and JP 2017-068394 A in addition to JP 2009-057014 A.

SUMMARY

By the way, in a vehicle that transports unspecified passengers like a mobility as a service (MaaS) vehicle, it is desired to provide a crime prevention service to a passenger getting off the vehicle. Illumination emitted to a moving destination position of a person in the related art described above is one type of the crime prevention service. However, in a case where the related art is applied to the vehicle that transports passengers like the MaaS vehicle, there is a possibility that a crime prevention service for a passenger getting off the vehicle cannot be appropriately provided, because the vehicle that transports passengers like the MaaS vehicle travels in accordance with an operation schedule, and thus, provision of the crime prevention service is cut off in the middle of irradiation of a position of the passenger getting off the vehicle with the illumination.

One object of the present disclosure is to provide a technique of enabling appropriate provision of a crime prevention service to a passenger getting off a vehicle in the vehicle that transports passengers.

A first aspect is a crime prevention system that provides a crime prevention service to a passenger getting off a vehicle that transports passengers and has the following features. The crime prevention system includes a recognition sensor that recognizes an environment situation around a vehicle and recognizes persons including the passenger getting off the vehicle, an illumination device, and an information processing device. The information processing device executes: evaluating whether or not a degree of safety of the passenger getting off the vehicle is equal to or higher than a predetermined level on the basis of a recognition result of the recognition sensor, in a case where the degree of safety is lower than the predetermined level, executing illumination control of irradiating a position of the passenger getting off the vehicle with illumination from the illumination device for a period set in accordance with the degree of safety while the vehicle is kept stopped, and terminating the illumination control in response to a predetermined termination condition being satisfied.

A second aspect further has the following features in addition to the first aspect. The recognition sensor is mounted on the vehicle, the illumination device is mounted on the vehicle, and the information processing device is mounted on the vehicle.

A third aspect further has the following features in addition to the first aspect. The recognition sensor includes a first recognition sensor mounted on the vehicle, and a second recognition sensor provided at an infrastructure device capable of performing communication with the vehicle. The information processing device evaluates whether or not the degree of safety is equal to or higher than the predetermined level on the basis of at least one of a first recognition result of the first recognition sensor and a second recognition result of the second recognition sensor.

A fourth aspect further has the following features in addition to the first aspect. The predetermined termination condition includes at least one of a condition that the degree of safety becomes equal to or higher than the predetermined level, a condition that a distance from the vehicle to the passenger getting off the vehicle becomes equal to or longer than a predetermined distance, a condition that the passenger getting off the vehicle is no longer recognized by the recognition sensor, and a condition that the passenger getting off the vehicle stays at a place where the passenger gets off the vehicle for a period equal to or longer than a fixed period.

A fifth aspect further has the following features in addition to the first aspect. The recognition of the environment situation includes at least one of obtainment of information on a degree of brightness and obtainment of information on a degree of busyness. The recognition of the persons includes at least one of obtainment of information regarding the passenger getting off the vehicle, obtainment of information regarding behavior of the passenger getting off the vehicle, obtainment of information regarding a surrounding person of the passenger getting off the vehicle and obtainment of information regarding behavior of the surrounding person of the passenger getting off the vehicle.

A sixth aspect further has the following features in addition to the fifth aspect. The information processing device evaluates the degree of safety on the basis of a combination of at least two among the information on the degree of brightness, the information on the degree of busyness, the information regarding the passenger getting off the vehicle, the information regarding the behavior of the passenger getting off the vehicle, the information regarding the surrounding person of the passenger getting off the vehicle, and the information regarding the behavior of the surrounding person of the passenger getting off the vehicle.

A seventh aspect is a crime prevention method for providing a crime prevention service to a passenger getting off a vehicle that transports passengers and has the following features. The crime prevention method includes evaluating whether or not a degree of safety of the passenger getting off the vehicle is equal to or higher than a predetermined level on the basis of a recognition result of a recognition sensor that recognizes an environment situation around the vehicle and recognizes persons including the passenger getting off the vehicle, in a case where the degree of safety is lower than the predetermined level, executing illumination control of irradiating a position of the passenger getting off the vehicle with illumination from an illumination device for a period set in accordance with the degree of safety while the vehicle is kept stopped, and terminating the illumination control in response to a predetermined termination condition being satisfied.

An eighth aspect is a crime prevention program that provides a crime prevention service to a passenger getting off a vehicle that transports passengers and has the following features. The crime prevention program causes a computer to execute evaluating whether or not a degree of safety of the passenger getting off the vehicle is equal to or higher than a predetermined level on the basis of a recognition result of a recognition sensor that recognizes an environment situation around the vehicle and recognizes persons including the passenger getting off the vehicle, in a case where the degree of safety is lower than the predetermined level, executing illumination control of irradiating a position of the passenger getting off the vehicle with illumination from an illumination device for a period set in accordance with the degree of safety while the vehicle is kept stopped, and terminating the illumination control in response to a predetermined termination condition being satisfied. Note that the crime prevention program may be stored in a non-transitory computer-readable storage medium.

According to a crime prevention system, a crime prevention method and a crime prevention program of the present disclosure, a degree of safety of a passenger getting off a vehicle is evaluated, and illumination control of irradiating a position of the passenger getting off the vehicle with illumination from an illumination device for a period set in accordance with the degree of safety while the vehicle is kept stopped is provided as a crime prevention service. It is therefore possible to appropriately provide a crime prevention service to a passenger getting off a vehicle in the vehicle that transports passengers.

BRIEF DESCRIPTION OF THE DRAWINGS

FIG. 2 is an explanatory diagram illustrating an evaluation example of a degree of safety of a passenger getting off a vehicle in the crime prevention system according to the first embodiment;

DETAILED DESCRIPTION

Figure 1:
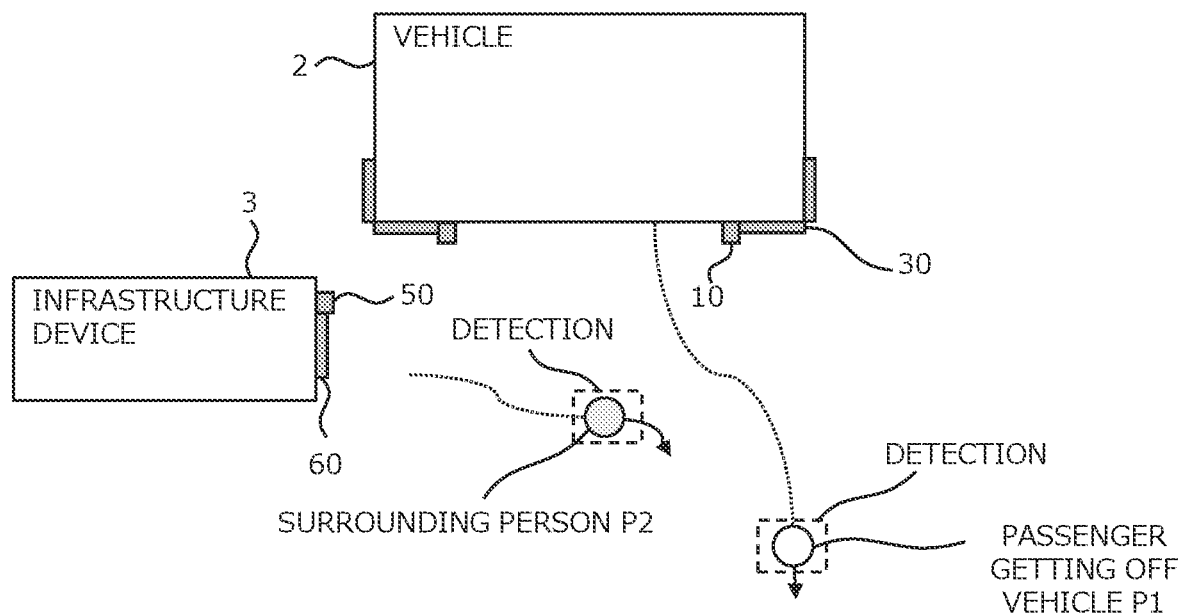
FIG. 1 is an explanatory diagram illustrating an execution example of illumination control in a crime prevention system according to a first embodiment.

A crime prevention system, a crime prevention method and a crime prevention program according to embodiments of the present disclosure will be described with reference to the accompanying drawings. Note that the crime prevention method and the crime prevention program according to the embodiments are implemented by computer processing of the crime prevention system according to the embodiments.

First Embodiment

1. Illumination Control 1-1. Outline

Use of a driverless vehicle in a transportation service that transports passengers can reduce personnel cost of a driver who operates the vehicle, which leads to provision of an inexpensive transportation service. However, a role of a driver of a vehicle that provides a transportation service in related art is not only operation of the vehicle but also include a role of a conductor such as collection of fares from passengers and guidance for passengers. In such a vehicle that provides a transportation service in related art, as a result of a driver who plays a role of a conductor other than operation of the vehicle getting on the vehicle, it is considered that a crime prevention effect is implicitly obtained.

On the other hand, in a driverless vehicle, as a result of a driver who plays a role of a conductor not getting on the vehicle, it is assumed that a crime prevention effect similar to a case where the driver gets on the vehicle cannot be obtained. Thus, to provide an inexpensive transportation service using a driverless vehicle without impairing safety and security of passengers, it is considered necessary to also provide a crime prevention service to the passengers.

Here, provision of what kind of crime prevention service is appropriate for a transportation service using a driverless vehicle will be considered. To obtain a certain crime prevention effect, it is considered necessary to irradiate at least a position of a passenger getting off a vehicle (hereinafter referred to as a "passenger getting off the vehicle") with illumination. By irradiating the position of the passenger getting off the vehicle with illumination to brighten a circumference of the passenger getting off the vehicle, it can make it difficult for a suspicious person to approach the passenger getting off the vehicle. Further, to improve a crime prevention effect in a driverless vehicle which a driver who plays a role of a conductor does not get on, it is considered important to keep the vehicle in a stopped state for a while. Keeping the vehicle in a stopped state puts a brake on a suspicious person as well as provides the passenger getting off the vehicle a sense of security. From the above, as a crime prevention service appropriate for a driverless vehicle, it is appropriate to irradiate the position of the passenger getting off the vehicle with illumination from an illumination device while the vehicle is kept stopped. Note that examples of the illumination device can include an illumination device mounted on the vehicle, and an illumination device provided at an infrastructure device provided at a platform, or the like.

A period during which the crime prevention service is provided will be considered next. The driverless vehicle travels in accordance with an operation schedule, and thus, a period during which the crime prevention service can be provided is limited. Further, it is assumed that a situation around the passenger getting off the vehicle changes on a moment-to-moment basis. Thus, it is desirable that the period during which the crime prevention service is provided is determined in accordance with the situation around the passenger getting off the vehicle, and control of irradiating (hereinafter, referred to as "illumination control") the position of the passenger getting off the vehicle with illumination from the illumination device while the vehicle is kept stopped is performed in the period. Examples of the situation around the passenger getting off the vehicle can include, for example, a situation of brightness around the vehicle, a situation of persons around the vehicle, a situation regarding surrounding persons of the passenger getting off the vehicle, and the like.

In the present embodiment, the period during which the illumination control is performed is set in accordance with a degree of safety of the passenger getting off the vehicle. The degree of safety is evaluated on the basis of the situation around the passenger getting off the vehicle. The evaluation of the degree of safety will be described in detail later. By setting the period of the illumination control in accordance with the degree of safety of the passenger getting off the vehicle, it is possible to provide a crime prevention service that is safe and secure for the passenger getting off the vehicle while providing an inexpensive transportation service by a driverless vehicle.

Note that it is assumed that the situation around the passenger getting off the vehicle changes on a moment-to-moment basis while the crime prevention service is provided. Further, it is considered that a behavior situation of the passenger getting off the vehicle also changes in addition to the situation around the passenger getting off the vehicle. As a result of change of these situations, it is assumed that a case may occur where the crime prevention service does not have to be provided to the passenger getting off the vehicle in midstream. In this case, provision of the crime prevention service to the passenger getting off the vehicle may be terminated in midstream. In a case where a condition for terminating provision of the crime prevention service is satisfied, processing of terminating the illumination control is performed. Examples of the case where the crime prevention service does not have to be provided can include a case where the degree of safety of the passenger getting off the vehicle reaches a level at which provision of the crime prevention service is unnecessary, a case where a distance from the vehicle to the passenger getting off the vehicle becomes equal to or longer than a fixed distance, a case where the passenger getting off the vehicle enters a building, a back street, or the like, and is no longer recognized by a sensor, or the like, provided at the vehicle or the infrastructure device, and the like.

A crime prevention system for executing the above-described illumination control (crime prevention system according to the first embodiment) will be described in detail below.

1-2. Specific Example

Figure 3:
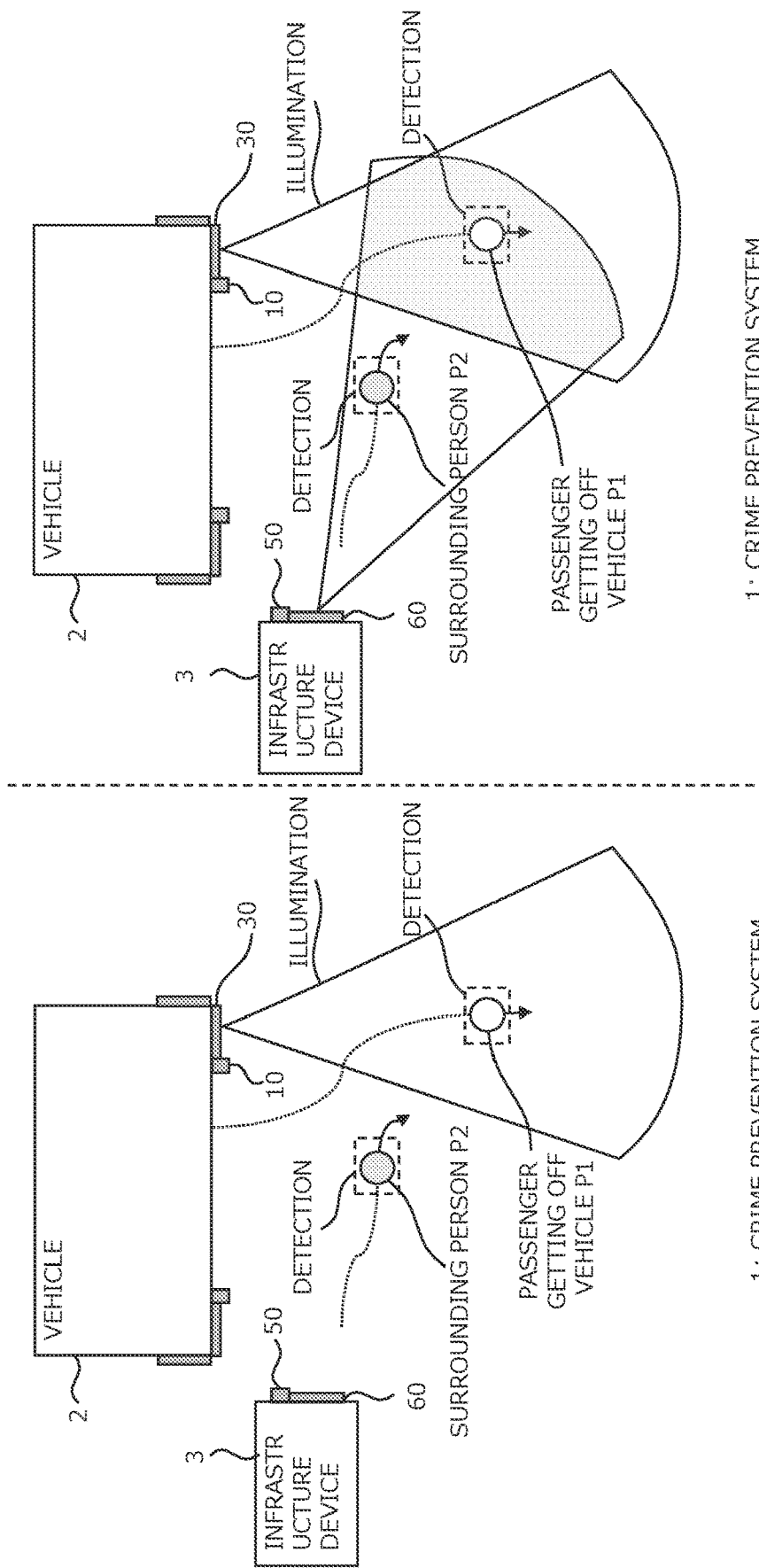
FIG. 3 is an explanatory diagram illustrating an execution example of the illumination control in the crime prevention system according to the first embodiment.
Figure 4:
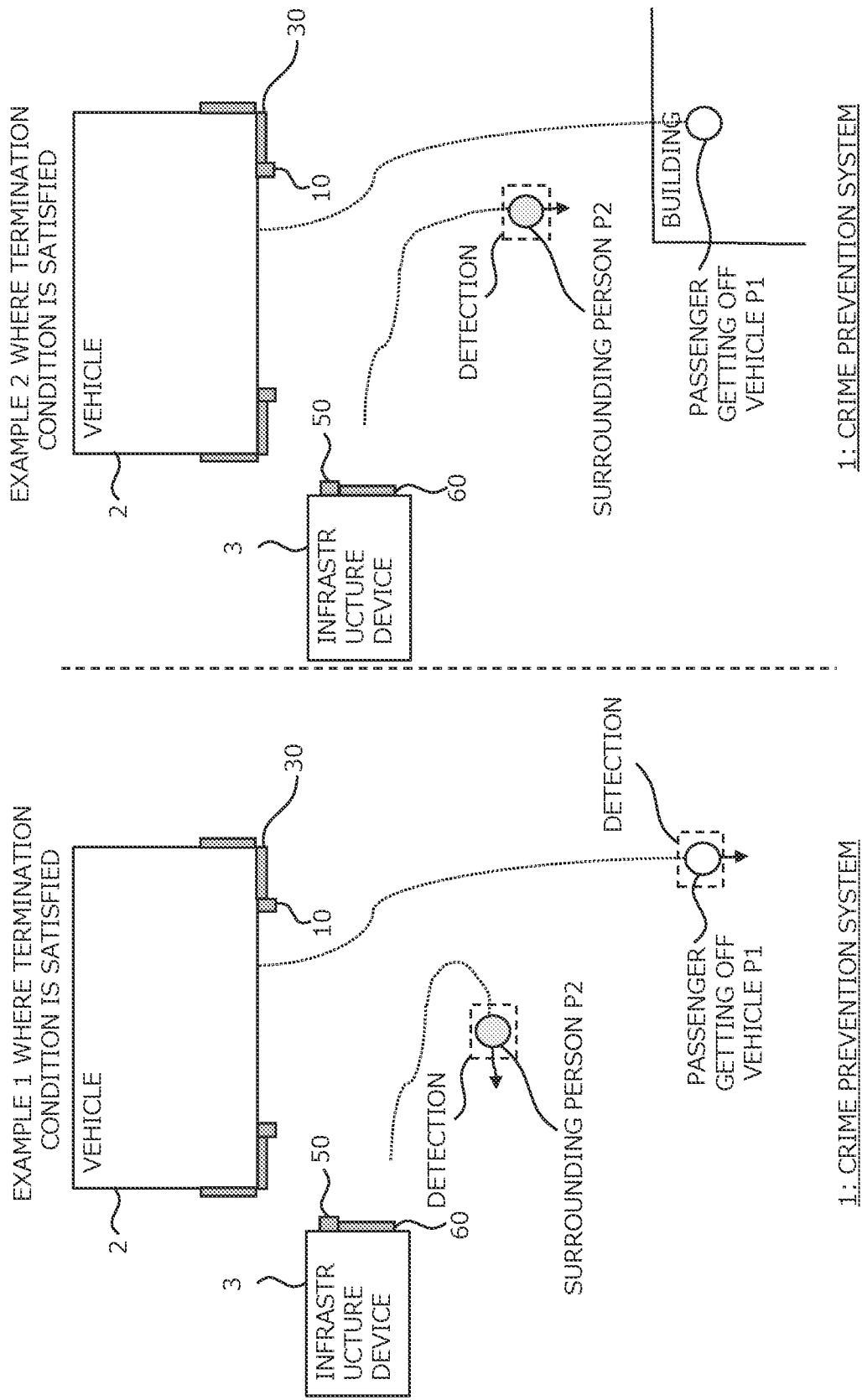
FIG. 4 is an explanatory diagram illustrating a termination example of the illumination control in the crime prevention system according to the first embodiment.

A specific example of the crime prevention system will be described using FIG. 1, FIG. 2, FIG. 3 and FIG. 4. FIG. 1 and FIG. 3 are explanatory diagrams illustrating an execution example of illumination control in the crime prevention system. FIG. 2 is an explanatory diagram illustrating an evaluation example of a degree of safety of the passenger getting off the vehicle in the crime prevention system. FIG. 4 is an explanatory diagram illustrating a termination example of the illumination control in the crime prevention system.

FIG. 1 illustrates an execution example of illumination control on a passenger P1 getting off a vehicle 2. The vehicle 2 according to the present embodiment is a driverless vehicle which a driver does not get on. The driverless vehicle includes an automated driving vehicle that autonomously travels, and a remote operation vehicle remotely operated by a remote operator. However, the automated driving vehicle includes a vehicle remotely monitored by a remote operator and a vehicle remotely supported as necessary. Note that a vehicle to which the present disclosure is applied is not limited to a driverless vehicle, and the present disclosure can also be applied to a manual driving vehicle which a driver gets on. After the vehicle 2 stops at a platform, one or more passengers P1 getting off the vehicle 2 are detected by at least one of a recognition sensor (hereinafter, referred to as a first recognition sensor 10) mounted on the vehicle 2 and a recognition sensor (hereinafter, referred to as a second recognition sensor 50) provided at an infrastructure device 3 provided at the platform. Further, one or more surrounding persons P2 located around the passenger P1 getting off the vehicle are detected by at least one of the first recognition sensor 10 and the second recognition sensor 50. However, FIG. 1 assumes a case where there is one passenger P1 getting off the vehicle and one surrounding person P2 to facilitate explanation. Examples of the first recognition sensor 10 and the second recognition sensor 50 can include a camera, laser imaging detection and ranging (LiDAR), a radar, and the like.

As a method for detecting the passenger P1 getting off the vehicle, in a case where after the passenger P1 getting off the vehicle performs behavior of getting off the vehicle 2 (such as, for example, payment of a fare), at least one of the first recognition sensor 10 and the second recognition sensor 50 recognizes a person getting off the vehicle 2, the person may be determined as the passenger P1 getting off the vehicle. Alternatively, a person getting off the vehicle 2 faces in a front direction, and thus, a person whose face is recognized by at least one of the first recognition sensor 10 and the second recognition sensor 50 for a period equal to or longer than a fixed period may be determined as the passenger P1 getting off the vehicle.

As illustrated in FIG. 1, the vehicle 2 includes an illumination device (hereinafter, referred to as a first illumination device 30) capable of illuminating a circumference of the vehicle 2, and the infrastructure device 3 also includes an illumination device (hereinafter, referred to as a second illumination device 60) capable of illuminating a circumference of the vehicle 2 in a similar manner to the vehicle 2. The infrastructure device 3 is a facility provided near a place where the passenger P1 getting off the vehicle gets off the vehicle 2, and includes, for example, a construction such as a bus stop, a lighting tower, and an electric pole. The infrastructure device 3 supports illumination control to be executed by the vehicle 2. Specifically, information on persons including the passenger P1 getting off the vehicle recognized by the second recognition sensor 50 included in the infrastructure device 3 is provided to the vehicle 2, and a position instructed by the vehicle 2 is irradiated with illumination by the second illumination device 60. The vehicle 2 and the infrastructure device 3 can perform communication with each other via a communication network.

After the passenger P1 getting off the vehicle and the surrounding person P2 are detected, evaluation is performed to determine a period during which the crime prevention service is provided to the passenger P1 getting off the vehicle. Specifically, as illustrated in FIG. 2, a degree of safety of the passenger P1 getting off the vehicle is evaluated on the basis of recognition information of an environment situation around the vehicle 2 and recognition information of the persons.

The recognition information of the environment situation around the vehicle 2 includes information on a degree of brightness around the vehicle 2, and information on crowdedness around the vehicle 2, that is, a degree of busyness. These kinds of information are recognized by at least one of the first recognition sensor 10 and the second recognition sensor 50. More specifically, the information on the degree of brightness is recognized by an illuminance sensor or a camera, and the information on the degree of busyness is recognized by at least one of a camera and LiDAR. In other words, the above-described first recognition sensor 10 and second recognition sensor 50 further include an illuminance sensor.

On the other hand, the recognition information of the persons includes information regarding the passenger P1 getting off the vehicle, information regarding behavior of the passenger P1 getting off the vehicle, information regarding the surrounding person P2 of the passenger P1 getting off the vehicle, and information regarding behavior of the surrounding person P2. The information regarding the passenger P1 getting off the vehicle includes the number of passengers P1 getting off the vehicle. The information regarding the behavior of the passenger P1 getting off the vehicle includes a relative distance between the passengers P1 getting off the vehicle. The information regarding the surrounding person P2 of the passenger P1 getting off the vehicle includes the number of surrounding persons P2. The information regarding the behavior of the surrounding person P2 includes a relative distance between the passenger P1 getting off the vehicle and the surrounding person P2. These kinds of information are recognized by at least one of the first recognition sensor 10 and the second recognition sensor 50.

The degree of safety of the passenger P1 getting off the vehicle is evaluated on the basis of a combination of at least two among the information on the degree of brightness, the information on the degree of busyness, the information regarding the passenger P1 getting off the vehicle, the information regarding the behavior of the passenger P1 getting off the vehicle, the information regarding the surrounding person P2 and the information regarding the behavior of the surrounding person P2. In the evaluation of the degree of safety, which one of a plurality of classified levels of the degree of safety, the degree of safety corresponds is determined. In the example illustrated in FIG. 2, the degree of safety is classified into five levels. As a level of the degree of safety is higher, it is considered that safety of a situation around the passenger P1 getting off the vehicle is higher. On the other hand, as a level of the degree of safety is lower, it is considered that safety of the situation around the passenger P1 getting off the vehicle is lower.

Each level of the degree of safety will be described in detail. As illustrated in FIG. 2, in a case where the environment situation around the vehicle 2 is bright, for example, in the daytime, safety of the situation around the passenger P1 getting off the vehicle is high, and thus, a level of the degree of safety in this case is set at level 5 that is the highest. In a case where the environment situation around the vehicle 2 is dark, for example, during the night, in a tunnel, or the like, and there are many people, safety of the situation around the passenger P1 getting off the vehicle is high, but lower than level 5, and thus, the level of the degree of safety in this case is set at level 4.

Note that if the level of the degree of safety is level 5 or level 4, it can be expected that safety of the situation around the passenger P1 getting off the vehicle is secured only by the environment situation around the vehicle 2. On the other hand, there can be a case where safety of the situation around the passenger P1 getting off the vehicle cannot be secured only by the environment situation around the vehicle 2. Such a case can include, for example, a case where the environment situation around the vehicle 2 is dark, for example, during the night, in a tunnel, or the like, and there are few people. Thus, in a case where a level of the degree of safety is lower than level 4, the information on the persons recognized by at least one of the first recognition sensor 10 and the second recognition sensor 50 is used to determine the level. Each level of the degree of safety lower than level 4 is specifically set as follows.

In a case where the number of persons recognized by at least one of the first recognition sensor 10 and the second recognition sensor 50 is one, and the person corresponding to the number of the persons is the passenger P1 getting off the vehicle, a level of the degree of safety is set at level 3. In a case where the number of persons recognized by at least one of the first recognition sensor 10 and the second recognition sensor 50 is two or more, and the passenger P1 getting off the vehicle is included in the number of the persons, a level of the degree of safety is set at level 2. In a case where the number of persons recognized by at least one of the first recognition sensor 10 and the second recognition sensor 50 is two or more, and a person who performs suspicious behavior is included in two or more passengers P1 getting off the vehicle included in the number of the persons, a level of the degree of safety is set at level 1. Further, also in a case where the number of persons recognized by at least one of the first recognition sensor 10 and the second recognition sensor 50 is two or more, and a person who performs suspicious behavior is included in one or more surrounding persons P2 included in the number of the persons, a level of the degree of safety is set at level 1.

After the degree of safety of the passenger P1 getting off the vehicle is evaluated, whether or not it is necessary to provide the crime prevention service and a provision period in accordance with the degree of safety are determined. In the example illustrated in FIG. 2, in a case where the degree of safety is equal to or higher than level 4, it is determined that provision of the crime prevention service is unnecessary, and the crime prevention service is not provided to the passenger P1 getting off the vehicle. On the other hand, in a case where the degree of safety is lower than level 4, it is determined that provision of the crime prevention service is necessary, and the crime prevention service is provided to the passenger P1 getting off the vehicle. In this case, further, the provision period of the crime prevention service is determined in accordance with the degree of safety. Specifically, as illustrated in FIG. 2, as the degree of safety is lower, the provision period of the crime prevention service is determined to be longer. Note that the number of levels of the degree of safety is not limited to five as illustrated in FIG. 2. For example, the degree of safety may be classified into two levels. More specifically, a level of the degree of safety may be set at level 2 at a bright place where sufficient illuminance can be obtained or a place where there are many people, and a level of the degree of safety at other places may be set at level 1.

After the provision period of the crime prevention service is determined in accordance with the degree of safety of the passenger P1 getting off the vehicle, the above-described illumination control is executed in the provision period. Specifically, as illustrated in FIG. 3, illumination control of irradiating a position of the passenger P1 getting off the vehicle with illumination from at least the first illumination device 30 mounted on the vehicle while the vehicle 2 is kept stopped is executed. As the illumination device to be used for the illumination control, as illustrated in a left part of FIG. 3, the first illumination device 30 may be used. Alternatively, as illustrated in a right part of FIG. 3, two illumination devices of the first illumination device 30 and the second illumination device 60 may be used. Note that FIG. 3 illustrates an execution example of illumination control in the crime prevention service in a case where the degree of safety of the passenger P1 getting off the vehicle illustrated in FIG. 2 is level 1.

Here, a method for irradiating the position of the passenger P1 getting off the vehicle with illumination will be considered. The position of the passenger P1 getting off the vehicle changes on a moment-to-moment basis, and thus, the illumination device can irradiate the position of the passenger P1 getting off the vehicle with illumination even in a case where the position changes as time passes. As a configuration of the illumination device, for example, a configuration where a direction of illumination can be controlled may be employed. Alternatively, a plurality of kinds of illumination with different directions may be provided so as to be able to perform irradiation with illumination corresponding to the position of the passenger P1 getting off the vehicle. As a method for controlling the direction of illumination, for example, there is a method in which a rotating portion that can change the direction of illumination in a horizontal direction and an elevating portion that can change an angle of the direction of illumination in a vertical direction are provided in a mechanical portion of the illumination, and a rotation angle of the rotating portion and an angle of elevation of the elevating portion are controlled.

If the degree of safety of the passenger P1 getting off the vehicle becomes equal to or higher than a fixed level (equal to or higher than level 4 illustrated in FIG. 2) while the illumination control is executed in accordance with the degree of safety of the passenger P1 getting off the vehicle, the illumination control may be terminated without being continued. Alternatively, in a case where the passenger P1 getting off the vehicle does not exist in a range that can be irradiated with illumination by the first illumination device 30 or the second illumination device 60, the illumination control may be terminated without being continued. Alternatively, in a case where the passenger P1 getting off the vehicle enters a building, a back street, or the like, and the passenger P1 getting off the vehicle is no longer recognized by the first recognition sensor 10 or the second recognition sensor 50, the illumination control may be terminated without being continued. Alternatively, in a case where the passenger P1 getting off the vehicle stays at the platform for a period equal to or longer than a fixed period to meet someone, transfer, or the like, the illumination control may be terminated without being continued. Thus, in a case where a predetermined termination condition is satisfied during execution of the illumination control, the illumination control is terminated. From this, the predetermined termination condition includes at least one of a condition that the degree of safety becomes equal to or higher than a predetermined level, a condition that a distance from the vehicle 2 to the passenger P1 getting off the vehicle becomes equal to or longer than a predetermined distance, a condition that the passenger P1 getting off the vehicle is no longer recognized by the first recognition sensor 10 or the second recognition sensor 50 and a condition that the passenger P1 getting off the vehicle stays at a place where the passenger P1 getting off the vehicle gets off the vehicle (that is, the platform) for a period equal to or longer than a fixed period.

Further, remote monitoring by a remote operator may be performed during execution of the illumination control in accordance with the degree of safety of the passenger P1 getting off the vehicle. In this case, information obtained by at least one of the first recognition sensor 10 and the second recognition sensor 50 is transmitted to the remote operator.

FIG. 4 is a view illustrating an example where the termination condition is satisfied. A left part of FIG. 4 illustrates an example of a case where the degree of safety becomes equal to or higher than the predetermined level. Specifically, an example of a case is illustrated where the state changes from a state where the degree of safety of the passenger P1 getting off the vehicle is level 1 illustrated in FIG. 2 (for example, a state where it is evaluated that there is a surrounding person P2 who follows the passenger P1 getting off the vehicle) to a state of level 2 (for example, a state where it is evaluated that there is no surrounding person P2 who follows the passenger P1 getting off the vehicle). In this case, if an elapsed period of the illumination control exceeds the provision period of the crime prevention service specified in level 2, the termination condition is satisfied.

On the other hand, a right part of FIG. 4 illustrates an example of a case where the passenger P1 getting off the vehicle is no longer detected by the first recognition sensor 10 or the second recognition sensor 50. Specifically, an example of a case is illustrated where the passenger P1 getting off the vehicle enters a building, or the like, while the degree of safety of the passenger P1 getting off the vehicle remains level 1 illustrated in FIG. 2. In this case, when the passenger P1 getting off the vehicle is no longer detected by the first recognition sensor 10 or the second recognition sensor 50, the termination condition is satisfied.

By the illumination control of the crime prevention system as described above being performed, the position of the passenger getting off the vehicle can be irradiated with illumination from the illumination device for a period set in accordance with the degree of safety of the passenger getting off the vehicle while the vehicle is kept stopped. This results in enabling appropriate provision of a crime prevention service to a passenger getting off a vehicle in the vehicle that transports passengers, so that it is possible to implement provision of a crime prevention service that is safe and secure for a passenger getting off a vehicle while providing an inexpensive transportation service by a driverless vehicle.

2. Crime Prevention System 2-1. Configuration Example

Figure 5:
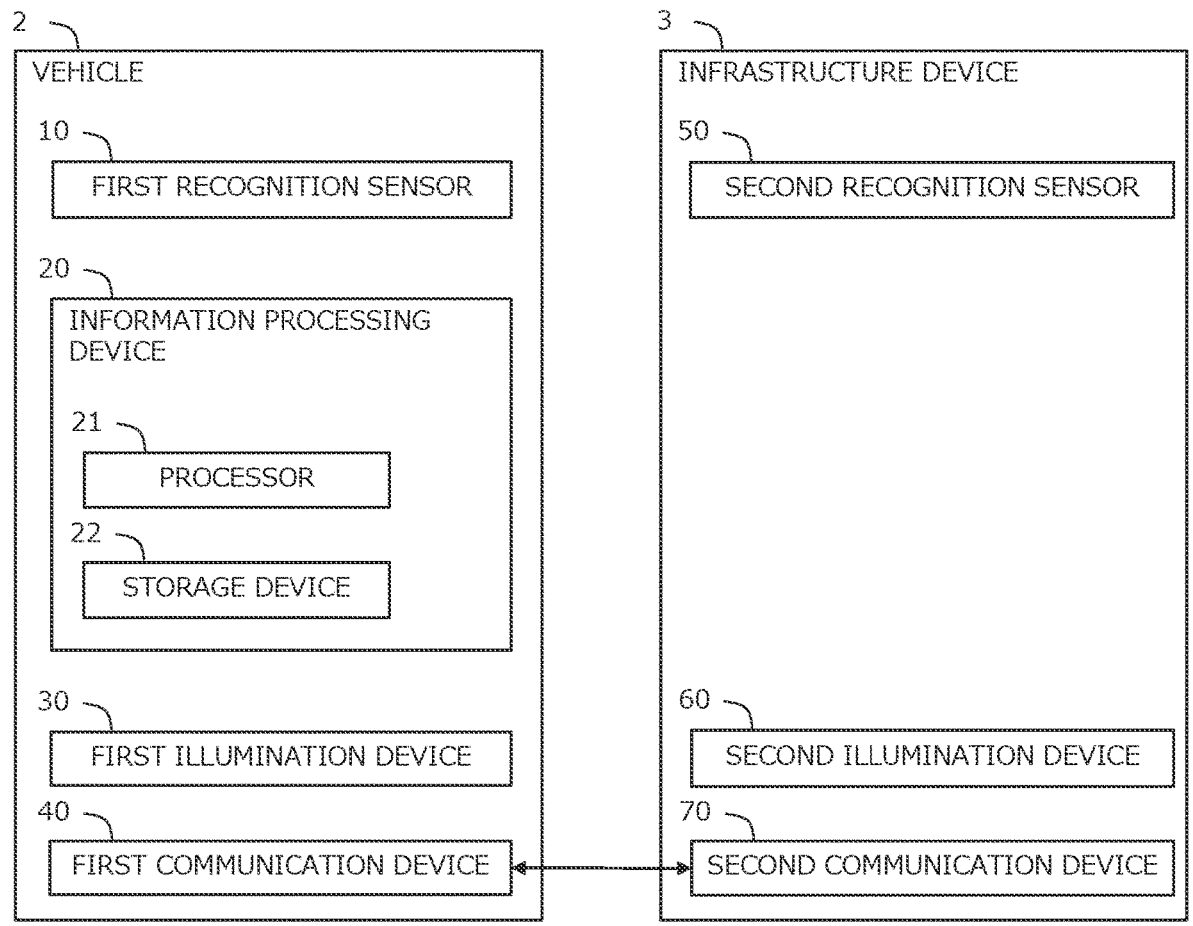
FIG. 5 is a block diagram illustrating a configuration example of the crime prevention system according to the first embodiment.

FIG. 5 is a block diagram illustrating a configuration example of the crime prevention system 1 according to the first embodiment. The crime prevention system 1 includes the vehicle 2 and the infrastructure device 3. The vehicle 2 includes the first recognition sensor 10, the information processing device 20, the first illumination device 30, and a first communication device 40 capable of performing communication with the infrastructure device 3. The infrastructure device 3 includes the second recognition sensor 50, the second illumination device 60, and a second communication device 70 capable of performing communication with the vehicle 2. The first recognition sensor 10 and the second recognition sensor 50 include a camera, LiDAR, a radar and an illumination sensor.

The information processing device 20 performs various kinds of information processing. Examples of the information processing device 20 can include, for example, an electronic control unit (ECU), and the like. The information processing device 20 includes one or a plurality of processors 21 (hereinafter, simply referred to as a processor 21), and one or a plurality of storage devices 22 (hereinafter, simply referred to as a storage device 22). The processor 21 executes various kinds of processing. Examples of the processor 21 can include, for example, a central processing unit (CPU), and the like. Examples of the storage device 22 can include a volatile memory, a non-volatile memory, a hard disk drive (HDD), a solid state drive (SSD), and the like. By the processor 21 executing a crime prevention program that is a computer program, functions of the crime prevention system 1 are implemented. The crime prevention program is stored in the storage device 22. The crime prevention program may be recorded in a computer-readable storage medium. The crime prevention program may be provided via a network.

The first communication device 40 receives recognition information of persons by the second recognition sensor 50 from the infrastructure device 3. Further, the first communication device 40 transmits information on an irradiation position of illumination in the second illumination device 60 to the infrastructure device 3. The second communication device 70 transmits the above-described recognition information of the persons to the vehicle 2 and receives the above-described information regarding the second illumination device from the vehicle 2.

2-2. Function Example

Figure 6:
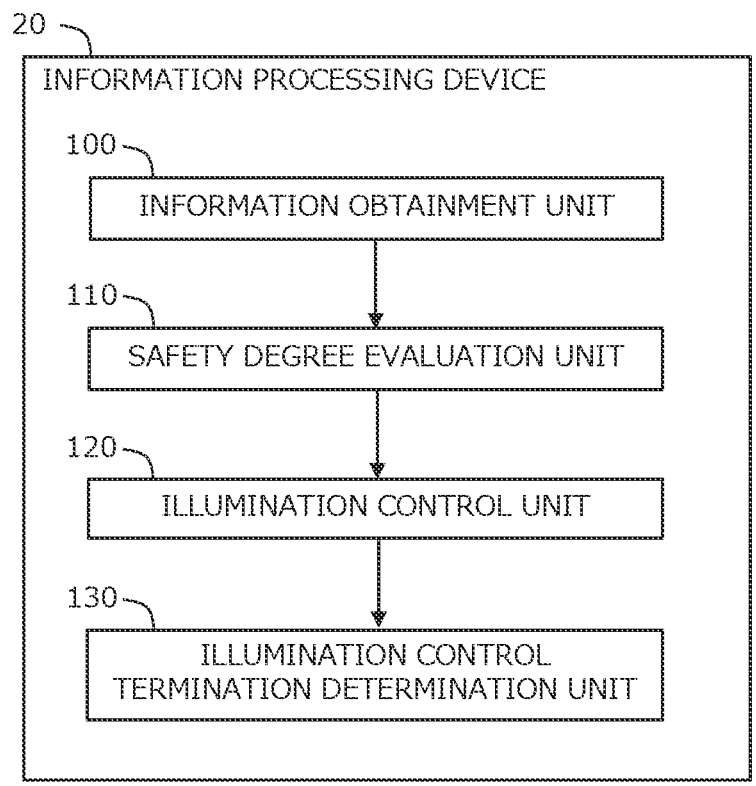
FIG. 6 is a block diagram illustrating a function example of an information processing device in the crime prevention system according to the first embodiment.

FIG. 6 is a block diagram illustrating a function example of the information processing device 20 in the crime prevention system 1 according to the first embodiment. The information processing device 20 includes an information obtainment unit 100, a safety degree evaluation unit 110, an illumination control unit 120 and an illumination control termination determination unit 130 as functional blocks. These functional blocks are implemented by the processor 21 executing the crime prevention program.

The information obtainment unit 100 obtains a recognition result of at least one of the first recognition sensor 10 and the second recognition sensor 50. The recognition result by the first recognition sensor 10 will be referred to as a first recognition result, and the recognition result by the second recognition sensor 50 will be referred to as a second recognition result. The first and the second recognition results include recognition information of the environment situation around the vehicle 2 and recognition information of the persons. The recognition information of the environment situation around the vehicle 2 and the recognition information of the persons are stored in the storage device 22. The recognition information of the environment situation around the vehicle 2 includes, for example, information on the degree of brightness obtained by the illuminance sensor, and information on the degree of busyness recognized on the basis of a camera image captured by the camera. The degree of brightness may be evaluated on the basis of color information of pixels in the camera image. The degree of busyness may be evaluated on the basis of information on a total number of persons detected from the camera image.

The recognition information of the persons includes, for example, information on the number of the passengers P1 getting off the vehicle, information on a relative distance between the passengers P1 getting off the vehicle, information on the number of the surrounding persons P2 of the passenger P1 getting off the vehicle, and information on a relative distance between the passenger P1 getting off the vehicle and the surrounding person P2. These kinds of information may be recognized on the basis of information on the camera image captured by the camera, point group information obtained by the LiDAR, information on a detection position of an object obtained by the radar, or the like.

The safety degree evaluation unit 110 evaluates the degree of safety of the passenger P1 getting off the vehicle on the basis of the recognition information of the environment situation around the vehicle 2 and the recognition information of the persons. Further, the safety degree evaluation unit 110 determines whether or not the degree of safety is lower than the predetermined level and sets a period of illumination control in accordance with the degree of safety. Details of the illumination control are the same as those described above, and thus, description will be omitted.

The illumination control unit 120 executes illumination control on the basis of the period set in the above-described safety degree evaluation unit 110.

The illumination control termination determination unit 130 determines whether or not a predetermined termination condition is satisfied during execution of the illumination control. Details of the termination condition are the same as those described above, and thus, description will be omitted.

2-3. Processing Example

Figure 7:
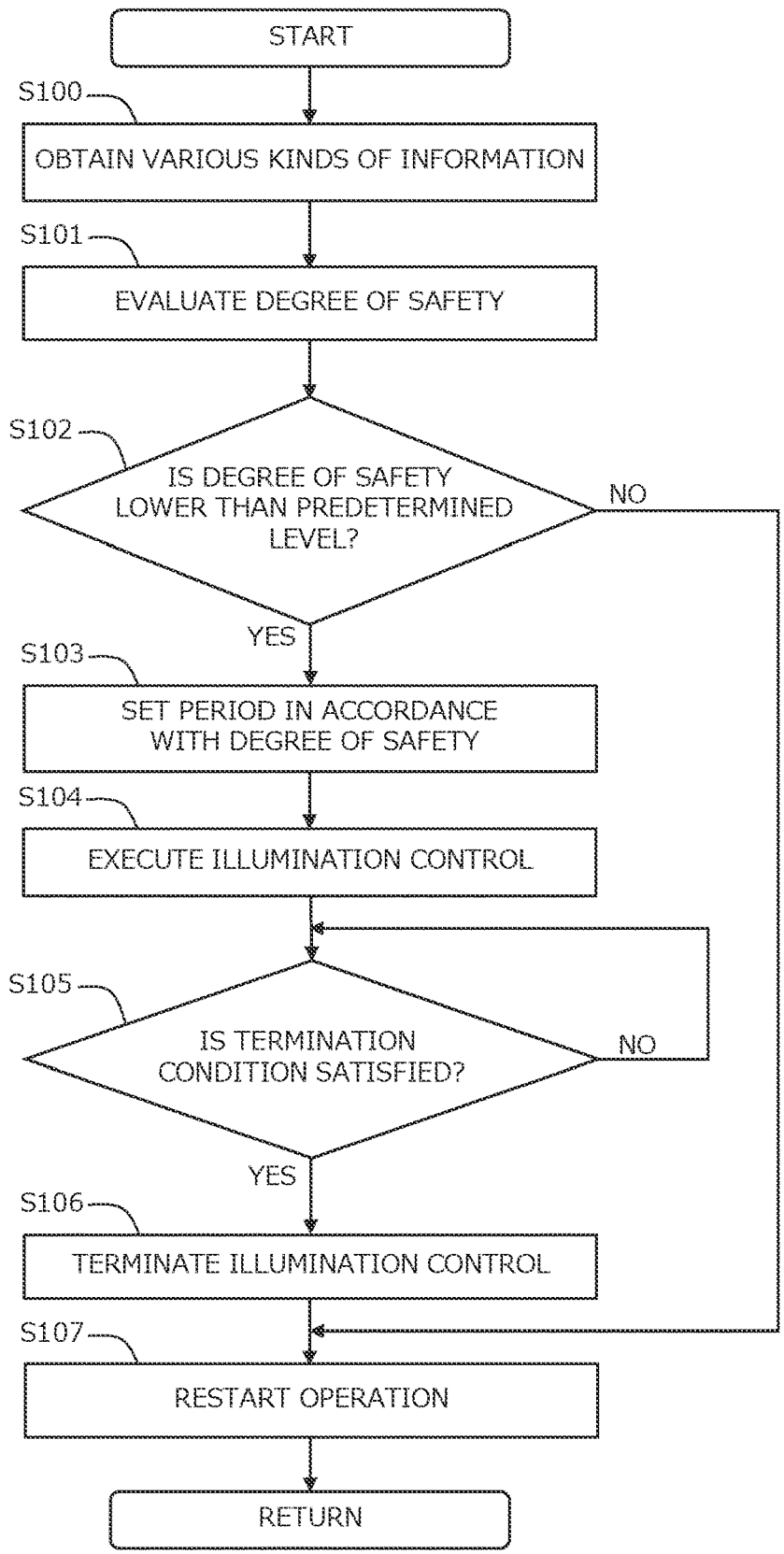
FIG. 7 is a flowchart illustrating a processing example of the information processing device in the crime prevention system according to the first embodiment.

FIG. 7 is a flowchart illustrating a processing example of the information processing device 20. The routine illustrated in FIG. 7 is repeatedly executed at a predetermined cycle.

In step S100, the information processing device 20 obtains various kinds of information stored in the storage device 22. Then, the processing proceeds to step S101. Examples of the various kinds of information can include the recognition information of the environment situation around the vehicle 2, the recognition information of the persons, and the like.

In step S101, the information processing device 20 evaluates the degree of safety of the passenger P1 getting off the vehicle on the basis of the recognition information of the environment situation around the vehicle 2 and the recognition information of the persons. Then, the processing proceeds to step S102.

In step S102, the information processing device 20 determines whether or not the degree of safety of the passenger P1 getting off the vehicle is lower than the predetermined level.

In a case where the degree of safety of the passenger P1 getting off the vehicle is lower than the predetermined level (step S102: Yes), the processing proceeds to step S103. In other cases (step S102: No), the processing proceeds to step S107.

In step S103, the information processing device 20 sets the period in accordance with the degree of safety of the passenger P1 getting off the vehicle. Then, the processing proceeds to step S104.

In step S104, the information processing device 20 executes illumination control. Then, the processing proceeds to step S105.

In step S105, the information processing device 20 determines whether or not the termination condition of the illumination control is satisfied.

In a case where the termination condition of the illumination control is satisfied (step S105: Yes), the processing proceeds to step S106. In other cases (step S105: No), the processing returns to step S105.

In step S106, the information processing device 20 terminates the illumination control. Then, the processing proceeds to step S107.

In step S107, the information processing device 20 restarts operation of the vehicle 2.

Second Embodiment

Figure 8:
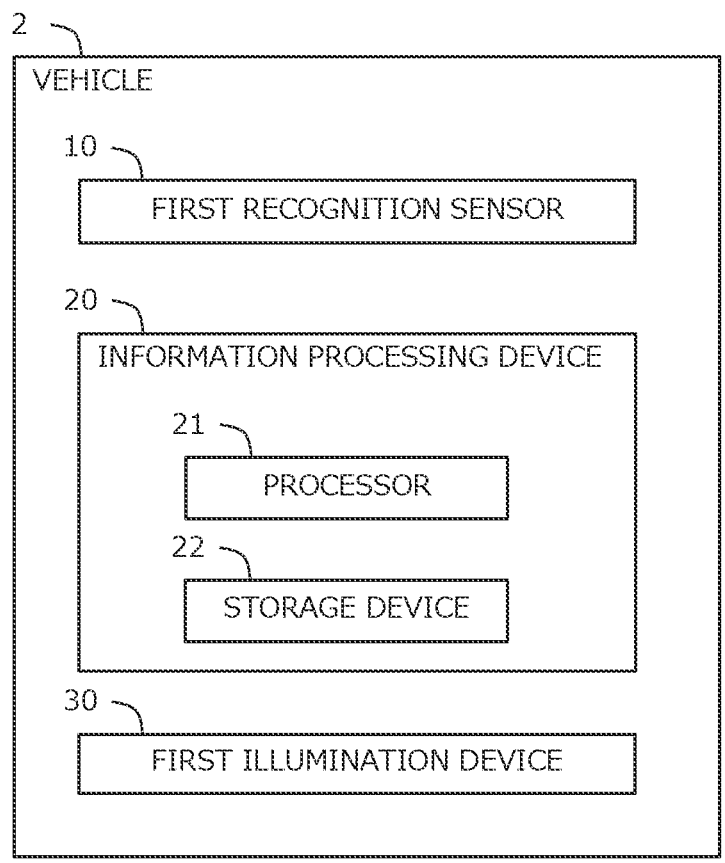
FIG. 8 is a block diagram illustrating a configuration example of a crime prevention system according to a second embodiment.

In the crime prevention system 1 according to the first embodiment, the illumination control for the passenger P1 getting off the vehicle is executed in cooperation with the vehicle 2 and the infrastructure device 3. However, the crime prevention system 1 may be constituted only with the vehicle 2 without including the infrastructure device 3. Thus, in a second embodiment, as illustrated in FIG. 8, the crime prevention system 1 is constituted only with the vehicle 2, and illumination control for the passenger P1 getting off the vehicle is executed only by the vehicle 2.

Other Embodiments

1. Specific Example 1

In the first and the second embodiments, illumination control is executed by using the first illumination device 30 and the second illumination device 60 capable of illuminating a circumference of the vehicle 2. In other embodiments, illumination control may be executed by further using a third illumination device which is mounted on the vehicle 2 and which illuminates steps when a passenger gets off the vehicle 2. By this technique, it can be expected that a crime prevention effect for the passenger P1 getting off the vehicle will be further improved.

2. Specific Example 2

The first and the second embodiments describe that illumination control for the passenger P1 getting off the vehicle is executed. According to other embodiments, passengers who are boarding on the vehicle 2 may be notified of a present state using a notification device (such as, for example, a speaker) mounted on the vehicle during execution of the illumination control. Examples of notification content can include "Safety outside the vehicle is being confirmed. Please wait until safety is confirmed", "Departure time is being adjusted. Please wait a while", and the like. By this technique, it can be expected to reduce a feeling of discomfort of passengers who wait inside the vehicle 2 during execution of the illumination control.

3. Specific Example 3

In the first and the second embodiments, after the vehicle 2 is stopped at the platform, the period of the illumination control is set in accordance with evaluation of the degree of safety. However, if there is recognition history information of the environment situation around the vehicle 2, it is possible to evaluate in advance at least whether or not a level of the degree of safety at arrival time for each platform is equal to or higher than level 4 illustrated in FIG. 2. According to other embodiments, whether or not a level of the degree of safety is equal to or higher than level 4 is evaluated for each platform on the basis of the recognition history information of the environment situation around the vehicle 2. An operation schedule is planned such that a stoppage period of the vehicle 2 becomes longer at a platform for which the level of the degree of safety is evaluated as lower than level 4. By causing the vehicle 2 to operate on the basis of this operation schedule, it is possible to reduce deviation between the operation schedule and an operation result, so that it is possible to prevent schedules of passengers who utilize the vehicle 2 from being disrupted.

What is claimed is:

1. A crime prevention system that provides a crime prevention service to a passenger getting off a vehicle that transports passengers, the crime prevention system comprising:
a recognition sensor configured to recognize an environment situation around the vehicle and recognize persons including the passenger getting off the vehicle;
an illumination device; and
an information processing device,
wherein the information processing device is configured to:
evaluate whether or not a degree of safety of the passenger getting off the vehicle is equal to or higher than a predetermined level on a basis of a recognition result of the recognition sensor;
in a case where the degree of safety is lower than the predetermined level, execute illumination control of irradiating a position of the passenger getting off the vehicle with illumination from the illumination device while the vehicle is kept stopped for a period set in accordance with the degree of safety; and
terminate the illumination control in response to a predetermined termination condition being satisfied.

2. The crime prevention system according to claim 1, wherein:
the recognition sensor is mounted on the vehicle;
the illumination device is mounted on the vehicle; and
the information processing device is mounted on the vehicle.

3. The crime prevention system according to claim 1, wherein the recognition sensor includes:
a first recognition sensor mounted on the vehicle; and
a second recognition sensor provided at an infrastructure device capable of performing communication with the vehicle,
wherein the information processing device is configured to evaluate whether or not the degree of safety is equal to or higher than the predetermined level on a basis of at least one of a first recognition result of the first recognition sensor and a second recognition result of the second recognition sensor.

4. The crime prevention system according to claim 1, wherein the predetermined termination condition includes at least one of a condition that the degree of safety becomes equal to or higher than the predetermined level, a condition that a distance from the vehicle to the passenger getting off the vehicle becomes equal to or longer than a predetermined distance, a condition that the passenger getting off the vehicle is no longer recognized by the recognition sensor, and a condition that the passenger getting off the vehicle stays at a place where the passenger getting off the vehicle gets off the vehicle for a period equal to or longer than a fixed period.

5. The crime prevention system according to claim 1, wherein:
the recognition of the environment situation includes at least one of obtainment of information on a degree of brightness and obtainment of information on a degree of busyness; and
the recognition of the persons includes at least one of obtainment of information regarding the passenger getting off the vehicle, obtainment of information regarding behavior of the passenger getting off the vehicle, obtainment of information regarding a surrounding person of the passenger getting off the vehicle and obtainment of information regarding behavior of the surrounding person.

6. The crime prevention system according to claim 5, wherein the information processing device is configured to evaluate the degree of safety on a basis of a combination of at least two among the information on the degree of brightness, the information on the degree of busyness, the information regarding the passenger getting off the vehicle, the information regarding the behavior of the passenger getting off the vehicle, the information regarding the surrounding person of the passenger getting off the vehicle and the information regarding the behavior of the surrounding person.

7. A crime prevention method for providing a crime prevention service to a passenger getting off a vehicle that transports passengers, the crime prevention method comprising:
evaluating whether or not a degree of safety of the passenger getting off the vehicle is equal to or higher than a predetermined level on a basis of a recognition result of a recognition sensor that recognizes an environment situation around the vehicle and recognizes persons including the passenger getting off the vehicle;
in a case where the degree of safety is lower than the predetermined level, executing illumination control of irradiating a position of the passenger getting off the vehicle with illumination from an illumination device while the vehicle is kept stopped for a period set in accordance with the degree of safety; and
terminating the illumination control in response to a predetermined termination condition being satisfied.

8. A non-transitory computer-readable storage medium storing a crime prevention program that is configured to cause a computer to execute:
evaluating whether or not a degree of safety of a passenger getting off the vehicle is equal to or higher than a predetermined level on a basis of a recognition result of a recognition sensor that recognizes an environment situation around the vehicle and recognizes persons including the passenger getting off the vehicle;
in a case where the degree of safety is lower than the predetermined level, executing illumination control of irradiating a position of the passenger getting off the vehicle with illumination from an illumination device while the vehicle is kept stopped for a period set in accordance with the degree of safety; and
terminating the illumination control in response to a predetermined termination condition being satisfied.

* * * * *